United States Patent [19]

Mizokami

[11] 4,214,825
[45] Jul. 29, 1980

[54] SHUTTER CONTROL MEANS WITH AUTO STROBO FOR ELECTRICAL SHUTTER CAMERA

[75] Inventor: Kazunori Mizokami, Hachioji, Japan

[73] Assignee: Olympus Optical Co., Ltd., Tokyo, Japan

[21] Appl. No.: 844,802

[22] Filed: Oct. 25, 1977

[30] Foreign Application Priority Data

Dec. 3, 1976 [JP] Japan .................. 51-162609[U]

[51] Int. Cl.² .................................. G03B 15/05
[52] U.S. Cl. .................. 354/33; 354/34; 354/139; 354/145
[58] Field of Search .......... 354/23 R, 27, 32–35, 354/48, 50, 51, 60 R, 60 F, 137, 139, 145, 149; 250/214 P; 315/241 P, 151, 159, 133, 31

[56] References Cited

U.S. PATENT DOCUMENTS

| | | |
|---|---|---|
| 3,673,415 | 6/1972 | Yoshimura et al. ............ 250/214 P |
| 3,720,144 | 3/1973 | Uchiyama ........................ 354/34 |
| 3,860,936 | 1/1975 | Harvey ............................ 354/51 |
| 3,978,496 | 8/1976 | Matsumoto ...................... 354/33 |
| 3,987,468 | 10/1976 | Matsuzaki et al. ............... 354/145 |
| 4,012,665 | 3/1977 | Nakamura et al. ............. 315/241 P |
| 4,016,575 | 4/1977 | Uchiyama et al. ............... 354/33 |
| 4,030,108 | 6/1977 | Yazaki et al. ................... 354/149 X |
| 4,078,242 | 3/1978 | Uchiyama et al. ............... 354/139 |

FOREIGN PATENT DOCUMENTS

4740329 10/1972 Japan .............................. 354/33

Primary Examiner—L. T. Hix
Assistant Examiner—William B. Perkey
Attorney, Agent, or Firm—Weinstein & Sutton

[57] ABSTRACT

A means for use with an auto strobo unit for a camera of the type having an electrical shutter comprises a delay circuit in the auto strobo unit which circuit includes a capacitor and a resistor connected in series and adapted to cooperate with the X contacts of the camera, and a circuit connected with the delay circuit and producing a shutter closing signal. The delay circuit has a time delay which is equal to or by a given length of time greater than the illumination time interval of the auto strobo unit which is adapted to be connected with the X contacts, so that when an illumination is provided by the auto strobo unit in response to the closure of the X contacts, the delay circuit is triggered to cause said shutter closing producing circuit to produce a shutter closing signal or an under-exposure signal to close the shutter, unless it was previously closed, at the end of the illumination time interval or a given length of time after such time interval.

6 Claims, 5 Drawing Figures

SHUTTER CONTROL MEANS WITH AUTO STROBO FOR ELECTRICAL SHUTTER CAMERA

BACKGROUND OF THE INVENTION

The invention relates to a shutter control means with auto strobo for a camera which incorporates an electrical shutter.

An auto strobo unit is a flash generator having an automatic light controlling capability, and comprises a flash discharge tube which is energized for illumination upon closure of the X contacts of the camera and in which the flash illumination is automatically interrupted by an illumination control circuit when a proper exposure level is reached. When the auto strobo unit is used in combination with the camera, the illumination control circuit of the flash illumination circuit within the auto strobo unit performs an arithmetic operation using aperture values preset in the camera, and interrupts the illumination of the flash discharge tube by means of an illumination stop signal when the calculated value reaches a given level or a proper exposure level. If the full illumination from the auto strobo unit is insufficient to reach the given value, the resulting photograph will be under-exposed. If the camera used is only capable of establishing an exposure period manually, a synchronized photographing will be achieved at a particular exposure period, usually 1/60 second, resulting in the closure of the shutter after 1/60 second even if the photographing is completed under an under-exposure condition. However, with an automatic exposure camera incorporating an electrical shutter which includes an automatic exposure control circuit of the type which does not employ a storage circuit, for example, an automatic exposure control circuit of direct photometry type, the shutter does not close after the completion of the illumination of the flash generator because of the under-exposure, continuing an automatic exposure controlling operation.

This will be more specifically described with reference to FIG. 1 which shows the integrated voltage of an arithmetic unit contained in the illumination control circuit of the auto strobo unit. In this Figure, the abscissa represents elapsed time T while the ordinate represents the integrated voltage V. When a photographing operation is initiated, a flash illumination is provided by the auto strobo unit at time $t_1$. Assuming that the flash illumination reaches a given decision level $V_1$ at time $t_2$, an illumination stop signal is then produced to interrupt the illumination of the flash discharge tube. However, in the event of under-exposure, the flash discharge type of the auto strobo unit will be fully energized for its full period and terminate at time $t_3$, as shown in FIG. 2. Still the integrated voltage V which varies in response to the amount of reflected light from an object being photographed fails to reach the decision level $V_1$. As a consequence, the automatic exposure control operation continues its timing function, maintaining the shutter open. For a daytime synchronized photographing operation, natural light alone will be thereafter incident on the photometeric element to reach the decision level after an increased time length or at time $t_4$, whereupon the shutter will be closed. Under this condition, the low illuminance of the environment is combined with the fact that the shutter is left open for a prolonged period of time after the termination of illumination from the flash discharge tube which depends on the value of diaphragm aperture, causing an unusual experience to the user. In addition, where a picture is taken while the camera is hand-held, a movement of the hands may cause doubled images. Therefore, it will be seen that the immediate closure of the shutter under these situations will result in a better photograph even though it may be exposed.

SUMMARY OF THE INVENTION

It is an object of the invention to provide a shutter control means used with an auto strobo unit for an electrical shutter camera which is constructed to produce a shutter closing signal at the termination of a given time interval after the termination of a flash illumination from the auto strobo unit which is operated by the closure of the X contacts of the camera, thereby assuring the closure of the shutter.

In accordance with the invention, the shutter control means used with an auto strobo unit for electrical shutter camera comprises a delay circuit including a capacitor and a resistor connected in series and adapted to cooperate with the X contacts of the camera, and a circuit connected with the delay circuit for producing a shutter closing signal or an under-exposure signal. The delay circuit has a time delay which is equal to or a suitable length of time greater than the illumination time interval or duration of the auto strobo unit. When the auto strobo unit supplies an illumination in response to the closure of the X contacts, the delay circuit is also triggered for operation to cause said circuit to produce a shutter closing signal at the termination or a given time length after the termination of the illumination from the auto strobo unit to close the shutter unless it was previously closed. In this manner, the inconveniences which result from the shutter being maintained open for a prolonged period of time are avoided.

DESCRIPTION OF PREFERRED EMBODIMENTS

Figure 1:
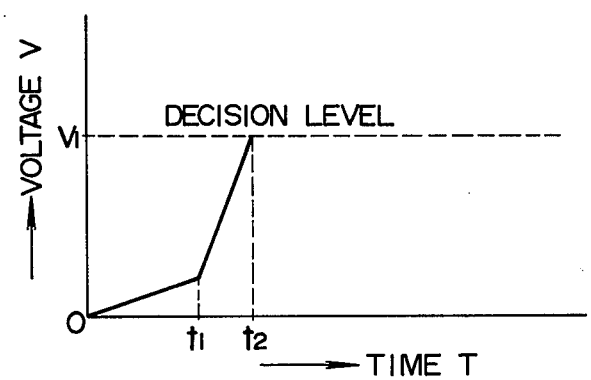
FIGS. 1 and 2 graphically show the integrated voltage versus time response of an illumination control circuit of an auto strobo unit under different conditions.
Figure 2:
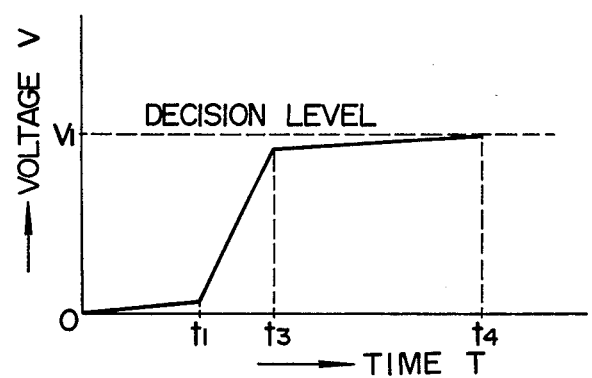
Figure 3:
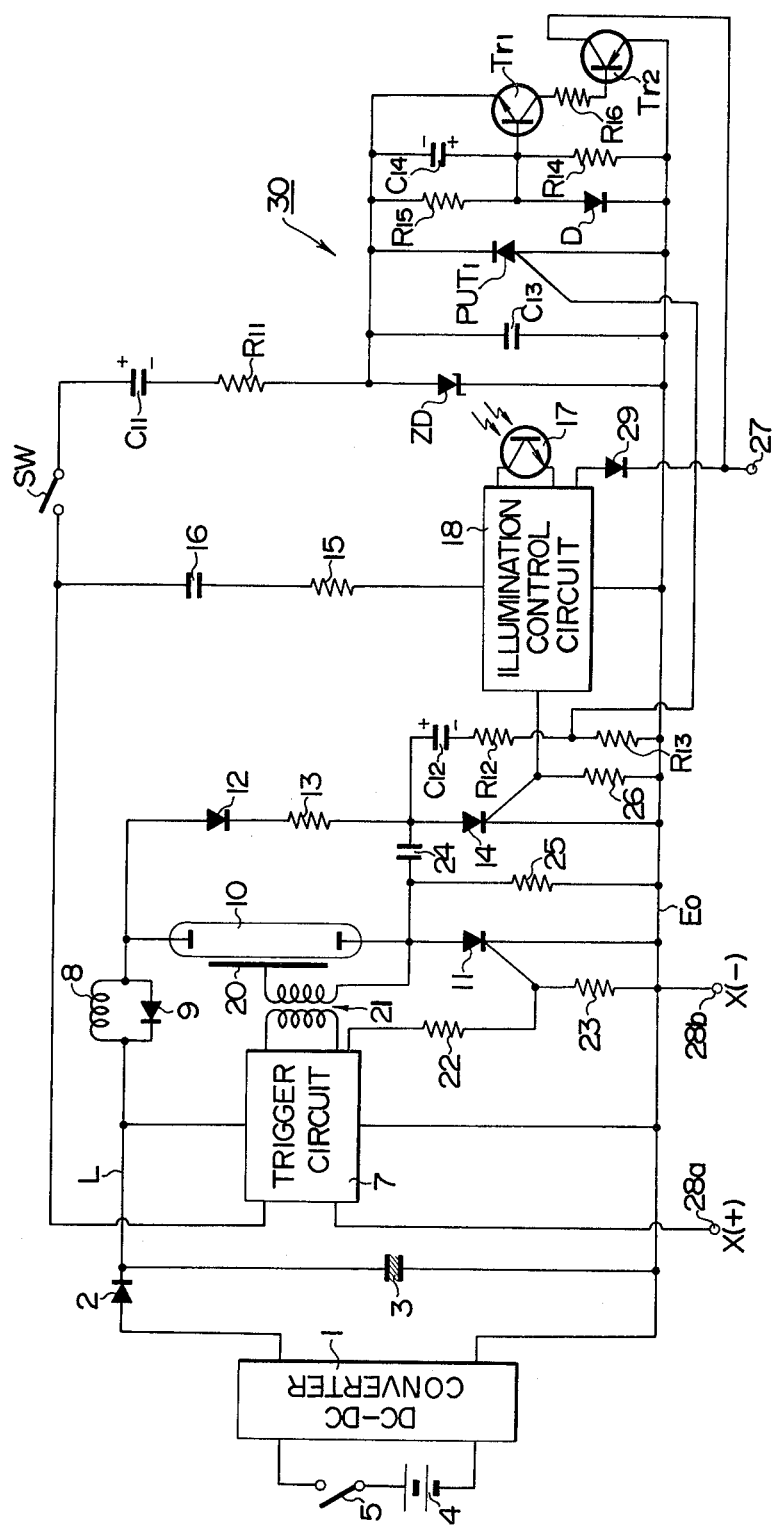
FIG. 3 is a circuit diagram of an embodiment of the invention.

Now referring to FIGS. 3 to 5, an embodiment of the present invention will be described. In FIG. 3, a flash illumination circuit includes a power source 4, which is connected through a main switch 5 with DC-DC converter 1. The converter serves to step up the source voltage to a given voltage level which is suitable to be supplied to the flash illumination circuit. A main capacitor 3 is connected through a diode 2 across the output terminals of the converter 1, and is shunted by a trigger circuit 7 of a known form. The main capacitor 3 has its positive plate connected with the diode 2 and the junction therebetween is connected to a positive supply line L. The negative plate of the capacitor 3 is connected with a negative supply line Eo. Specifically, in addition to the trigger circuit 7, connected across the lines L and Eo in series with a parallel combination of a coil 8 and diode 9 are a series circuit comprising a flash discharge tube 10 and a silicon controlled rectifier 11, and another series circuit comprising a diode 12, resistor 13, and commutating SCR 14.

An illumination control circuit 18 is connected in series with a resistor 15 and capacitor 16 between the trigger circuit 7 and the line Eo. A terminal 28a is connected with the trigger circuit 7 for connection with the positive terminal 19a of the X contacts 6 (see FIGS. 4 and 5) of a camera. A trigger transformer 21 is connected across the output terminals of the trigger circuit 7 for applying a trigger voltage to the trigger electrode 20 of the flash discharge tube 10. The tube 10 may comprise an Xenon discharge tube, and the main silicon controlled rectifier SCR 11, which controls the current flow through the discharge tube, has its gate connected with the junction between a pair of resistors 22, 23 which are connected in series between the trigger circuit 7 and the line Eo. The anode of main SCR 11 is connected with the anode of the commutating SCR 14 through a commutation capacitor 24, and a resistor 25 is connected in shunt with the anode-cathode path of the main SCR 11. A firing voltage to the gate of the commutation SCR 14 is applied by the illumination control circuit 18. A resistor 26 is connected between the gate of SCR 14 and the line Eo.

A signal indicative of the fact that the shutter in a camera is operated is applied to the illumination control circuit 18 through a signal terminal 27 and a diode 29. When the flash discharge tube 10 produces an illumination, reflected light from an object being photographed impinges on a light receiving element 17 connected with the circuit 18, and applies a firing voltage to the gate of the commutation SCR 14 when the amount of exposure, as calculated by the control circuit, reaches a given decision level. A terminal 28b is shown connected with the line Eo for connection with the negative terminal 19b of the X contacts 6 (see FIGS. 4 and 5).

In accordance with the invention, the described auto strobo unit is combined with a delay circuit and a shutter closing signal producing circuit. As shown in FIG. 3, the circuit 30 for producing a shutter closing signal includes a switch SW, switching transistors Tr1, Tr2, programmable unijunction transistor PUT 1, constant voltage diode ZD, diode D, resistors R11 to R16 and capacitors C11 to C14. It is to be understood that the shutter closing signal is produced at the time when the illumination of the auto strobo unit is terminated and the amount of exposure still does not reach a required value, namely under an under-exposure condition, and hence represents an under-exposure signal. The switch SW, capacitor C11, resistor R11 and diode ZD are connected in a series circuit, which is connected in parallel with the series circuit comprising the capacitor 16, resistor 15, and the illumination control circuit 18.

The capacitor C13 is connected in shunt with the diode ZD, and is in turn shunted by the transistor PUT 1. This transistor is shunted by a series circuit formed by the resistor R15 and diode D, and is also shunted by a series circuit formed by the capacitor C14 and resistor R14 which constitute a delay circuit. The junction between the capacitor C14 and resistor R14 is connected with the junction between the resistor R15 and diode D and also with the base of the switching transistor Tr1. As shown, the transistor Tr1 comprises an NPN transistor having its emitter connected with the junction between the resistor R11 and diode ZD. The transistor Tr1 has its collector connected through the resistor R16 with the base of the switching transistor Tr2, which is formed by a PNP transistor and having its collector connected with the signal terminal 27. The emitter of the transistor Tr2 is connected with the line Eo. The time constant of the delay circuit formed by the capacitor C14 and resistor R14 is chosen such that the potential of the capacitor C14 applies a forward bias voltage to the base of the transistor Tr1 to turn it on immediately after the flash discharge tube 10 has terminated its illumination. The capacitor C12 and resistors R12, R13 from a series circuit which is connected in parallel with SCR 14, with the junction between the resistors R12, R13 being connected with the gate of the transistor PUT 1.

Figure 4:
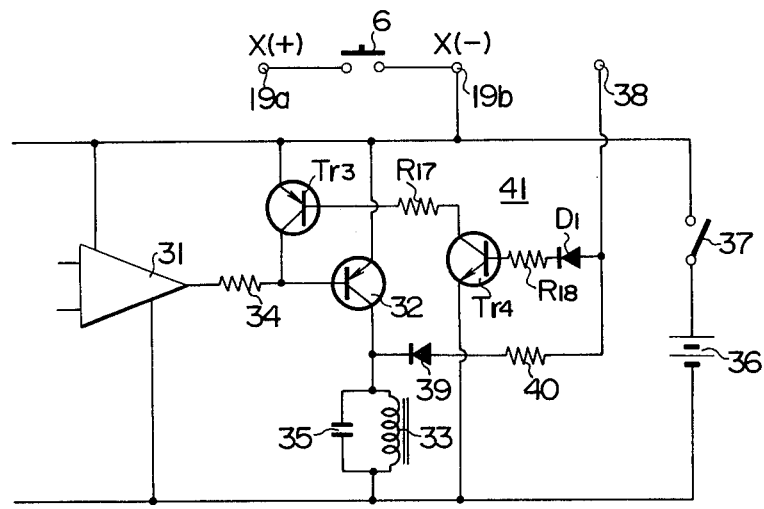
FIG. 4 is a circuit diagram of a shutter electromagnet drive circuit of an electrical shutter in combination with a coupling network which applies a shutter closing signal thereto.
Figure 5:
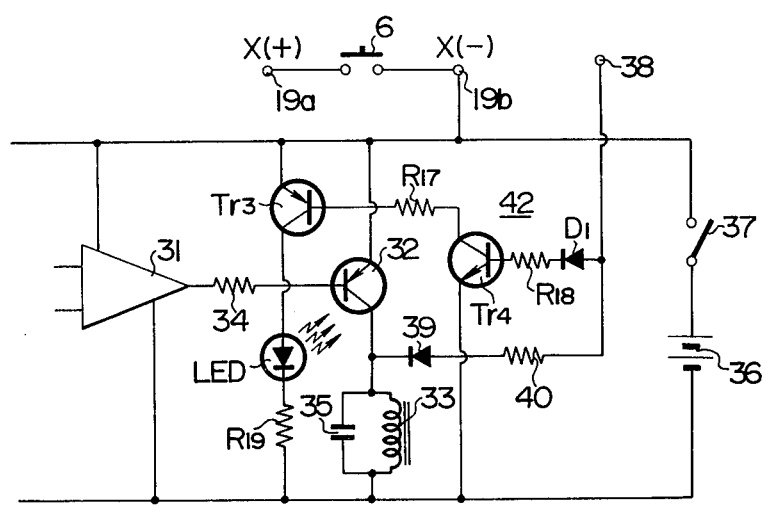
FIG. 5 is a circuit diagram of another example of the coupling network.

FIG. 4 is a circuit diagram of one example of a coupling network for applying a shutter closing signal from the circuit 30 of FIG. 3 to a shutter electromagnet drive circuit. The drive circuit is conventional, and in the example shown, comprises a switching transistor 32 responsive to an output signal from a comparator 31, an electromagnet 33 for constraining the second blind from running to close the shutter, a resistor 34 and a capacitor 35. The transistor 32 is connected in series with the electro magnet 33, and is connected with a power source 36 of the electrical shutter circuit through a main switch 37. The comparator 31 is also connected with the source 36 through the switch 37. The output terminal of the comparator 31 is connected through the resistor 34 with the base of the transistor 32, and the capacitor 35 shunts the magnet 33.

Upon shutter release, as the electro first blind of the shutter runs to open an exposure light path, the transistor 32 is rendered conductive to energize the electromagnet 33 for constraining the second blind from running. When proper exposure is attained as determined by the amount of reflected light from an object being photographed, the comparator 31 produces an output signal, which turns the transistor 32 off, deenergizing the electromagnet 33 to allow the running of the second blind to close the shutter automatically. A signal terminal 38 is connected through diode 39 and resistor 40 with the junction between the collector of the transistor 32 and the electromagnet 33 for connection with the signal terminal 27 of the strobo unit. The X contacts 6 of the camera are shown connected between the terminals 19a and 19b, the latter terminal 19b being connected with the positive terminal of the source 36 through the switch 37.

A coupling network 41 which applies the shutter closing signal to the drive circuit comprises a PNP transistor Tr3, an NPN transistor Tr4, resistors R17 and R18 and diode D1. The transistor Tr3 has its emitter connected with the positive terminal of the source 36 through the switch 37 while its collector is connected with the base of the switching transistor 32. The base of the transistor Tr3 is connected through the resistor R17 with the collector of the transistor Tr4, which has its base connected through to the resistor R18 and diode D1 in series with the signal terminal 38. The emitter of the transistor Tr4 is connected with the negative terminal of the source 36.

When a camera having the described shutter circuit which incorporates the coupling network 41 is combined with the auto strobo unit for taking a picture under a flashlight illumination, the circuit operates as follows: When the camera is coupled with the auto strobo unit, the terminals 19a, 19b and 38 are connected with the terminals 28a, 28b, and 27, respectively. Under this condition, the main switch 5 of the auto strobo unit and the switch SW in the circuit 30 are closed as is the main switch 37 of the camera. When the main switch 5 of the auto strobo unit is closed, the main capacitor 3, a trigger capacitor (not shown) contained in the trigger circuit 7, commutation capacitor 24 and capacitor 16 will be charged, and the closure of the switch SW charges the capacitors C11, C13, and C14. After the completion of the charging of the individual capacitors, the shutter of the camera may be released. Thereupon, the shutter is opened to close the X contacts 6, whereby the trigger circuit 7 is activated to apply a trigger voltage to the electrode 20, thus firing SCR 11. As a result, a discharge current flows through the flash discharge tube 10, producing a flash illumination.

When the trigger circuit 7 is activated, the charge on the capacitor C11 discharges with a time constant determined by the resistance of the resistor R11 and the capacitance of the capacitor C11. During such discharge, a definite voltage maintained by the diode ZD is applied to the circuit 30, and is maintained after the termination of the illumination of the discharge tube 10 for a given time interval, for example, several milliseconds. Then the capacitor C14 begins to charge up with a time constant determined by the values of the components C14 and R14. In this manner, the charging of the capacitor C14 is initiated substantially simultaneously with the activation of the trigger circuit 7. The circuit arrangement is such that the potential on the capacitor C14 reaches a level which is sufficient to turn the transistor Tr1 on immediately after the termination of the illumination of the discharge tube 10 whenever the illumination control circuit 18 determines that a decision level representing a proper exposure is not reached. When the transistor Tr1 is turned on, the transistor Tr2 is also turned on, whereby the terminal 28b is connected with the terminal 27 through the transistor Tr2 and hence with the signal terminal 38 (see FIG. 4), applying a voltage $V_E$ from the power source 36 of the camera thereto. This voltage is applied through diode D1 and resistor R18 to the base of the transistor Tr4 to turn it on. Thereupon, the transistor Tr3 is also turned on, short-circuiting the base-emitter path of the switching transistor 32 in the drive circuit, thus deenergizing the electromagnet 33. As a consequence, the second blind of the shutter is allowed to run, terminating an exposure period. In this manner, the shutter is automatically closed even under an under-exposure condition resulting from insufficient flash illumination, preventing an uncertain continued exposure condition. It will be seen that the transistor Tr2 will be turned off when the capacitor C11 is completely discharged.

During a flash photography under the illumination produced by the discharge tube 10, when the illumination control circuit 18 responsive to the amount of reflected light from an object being photographed determines that a decision level representing a proper exposure is reached, it produces an output signal, which is applied to render the commutation SCR 14 conductive, diverting the current flow through the discharge tube 10 to a series path including the diode 12, resistor 13 and SCR 14, thus interrupting the illumination by the discharge tube 10. In this instance, the charge on the capacitor C12 discharges through the commutation SCR 14, producing a negative pulse across the resistor R13 which is applied to the gate of the transistor PUT 1 as a firing voltage. Thus, the transistor PUT 1 is rendered conductive, short-circuiting the diode ZD and providing a discharge path for the capacitor C14. Therefore, no shutter closing signal is produced by the circuit 30.

In the embodiment described above, the electromagnet 33 is deenergized by direct connection of the transistor Tr3 with the switching transistor 32. However, a modified coupling network 42 shown in FIG. 5 may be employed to connect the collector of the transistor Tr3 through a series combination of a light emitting diode LED and resistor R19 with the negative terminal of the source 36, rather than connecting it with the base of the switching transistor 32, so that the light emitted by LED is received by a light receiving element (not shown) within the camera. With this arrangement, when the transistor Tr3 is turned on, the diode LED emits light, which impinges upon the light receiving element of the camera to operate the electrical shutter, causing the comparator 31 to produce an output signal which turns off the switching transistor 32 for deenergization of the electromagnet 33. In all other respects, the construction and operation of the circuit 42 is similar to that shown and described in connection with FIG. 4.

In the described embodiments, the closure of the X contacts causes a discharge of the capacitor contained in the delay circuit, but alternatively, the circuit arrangement may be slightly modified so that the closure of the X contacts causes a charging of the capacitor.

What is claimed is:

1. An auto strobo unit for use with the electrical shutter circuit of a camera, said electrical shutter circuit including X contacts for triggering operation of the auto strobo unit upon initiation of a photographing operation and exposure control means for operating said electrical shutter circuit to a shutter closing condition when light reflected from the object being photographed reaches a sufficient level, said auto strobo unit comprising:

a flash lamp;
a trigger circuit responsive to closure of X contacts for energizing said flash lamp;
illumination control means responsive to light reflected from the object being photographed to extinguish the flash lamp when the reflected light reaches a predetermined level;
delay means operative responsive to energization of said flash lamp for establishing a fixed time delay interval;
switching means responsive to said delay means for applying a shutter closing signal to said electrical shutter circuit upon the end of said delay interval;
control means responsive to the flash lamp extinguishing condition of said illumination control circuit to prevent said delay means from operating said switching means whereby said electrical shutter circuit is operated to said shutter closing condition responsive only to said exposure control means;
said delay means being adapted to establish a delay interval which terminates immediately after termination of the illumination of the flash lamp in the absence of a flash lamp extinguishing condition by said illumination control circuit whereby the electrical shutter circuit is operated by said delay means in the presence of an insufficient exposure condition and is operated by said exposure control means in the presence of a sufficient exposure condition.

2. An auto strobo unit for use with the electrical shutter circuit of a camera, said electrical shutter circuit including X contacts for triggering operation of the auto strobo unit upon initiation of a photographing operation, and exposure control means for operating said electrical shutter circuit to a shutter closing condition when light reflected from the object being photographed reaches a sufficient level, said auto strobo unit comprising:

a flash lamp;

a trigger circuit responsive to closure of said X contacts for energizing said flash lamp;

delay means being operative responsive to energization of said flash lamp for establishing a fixed time delay interval;

switching means responsive to said delay means for applying a shutter closing signal to said electrical shutter circuit upon the end of said delay interval;

said delay means being adapted to establish a time delay interval which is at least equal to and preferably slightly greater than the time interval during which the flash lamp is illuminated whereby the auto strobo unit generates a shutter closing signal to operate said electrical shutter circuit independently of said exposure control means to prevent the photographing operation from extending over a prolonged period of time;

said auto strobo unit further comprising an illumination control circuit for controlling the time interval during which said flash lamp is illuminated; and coupling means extending between said auto strobo unit and said electrical shutter circuit for coupling said shutter-closing signal from the switching means in said auto strobo unit to said electrical shutter circuit and for coupling the electrical shutter circuit to said illumination control circuit, said coupling means comprising a common transmission path for respectively coupling said shutter-closing signal to said electrical shutter circuit and for presenting the condition of said shutter to said illumination control circuit.

3. The apparatus of claim 2 further comprising means responsive to said illumination control circuit for extinguishing said flash lamp when the reflected light received from the object being photographed reaches a predetermined desired level;

means responsive to said flash lamp being extinguished for disabling said delay means in the event that the time delay interval of said delay means has not elapsed.

4. The apparatus of claim 2 wherein said electrical shutter circuit comprises first electronic switching means responsive to said exposure control means for preventing a shutter closing condition when in a first state and for enabling a shutter closing condition when in a second state;

second electronic switching means responsive to said shutter-closing signal for driving said first electronic switching means to said second state;

diode means for coupling said first and second electronic switching means to said common transmission path whereby said first electronic switching means is prevented from operating said second electronic switching means.

5. The apparatus of claim 2 wherein said switching means is directly connected to said common transmission path and wherein diode means couples the input of said illumination control circuit to said common transmission path to electrically isolate said illumination control circuit and said switching means from one another.

6. An auto strobo unit and a camera including an electrical shutter circuit, said electrical shutter circuit including X contacts for triggering operation of the auto strobo unit upon initiation of a photographing operation, and exposure control means for operating said electrical shutter circuit to a shutter closing condition when light reflected from the object being photographed reaches a sufficient level, said auto strobo unit comprising:

a flash lamp;

a trigger circuit responsive to closure of said X contacts for energizing said flash lamp;

delay means being operative responsive to energization of said flash lamp for establishing a fixed time delay interval;

switching means responsive to said delay means for applying a shutter closing signal to said electrical shutter circuit upon the end of said delay interval;

said delay means being adapted to establish a time delay interval which is at least equal to and preferably slightly greater than the time interval during which the flash lamp is illuminated whereby the auto strobo unit generates a shutter closing signal to operate said electrical shutter circuit independently of said exposure control means to prevent the photographing operation from extending over a prolonged period of time;

means including a light-emitting element provided in said electrical shutter circuit and energized responsive to said shutter-closing signal to illuminate said light-emitting element; and said electric shutter circuit having a light sensing element, whereby said light-sensing element operates the electric shutter circuit to generate said shutter closing condition responsive to the light received from the energized light-emitting element regardless of whether light reflected from the object is sufficient to cause a shutter closing condition.

* * * * *

UNITED STATES PATENT AND TRADEMARK OFFICE
CERTIFICATE OF CORRECTION

PATENT NO. : 4,214,825
DATED : July 29, 1980
INVENTOR(S) : Kazunori Mizokami

It is certified that error appears in the above—identified patent and that said Letters Patent is hereby corrected as shown below:

Column 2, line 6, change "exposed" to --under-exposed--.

Column 4, line 11, change "from" to --form--.

Column 4, line 30, change "magnet" to --electro-magnet--.
Column 4, line 31, delete "electro".
Column 4, line 58, delete "through".

Claim 1, line 36, change "graped" to --graphed--.

Signed and Sealed this

Twenty-eighth Day of April 1981

[SEAL]

Attest:

RENE D. TEGTMEYER

Attesting Officer

Acting Commissioner of Patents and Trademarks